United States Patent
Hadfield

[15] 3,698,534
[45] Oct. 17, 1972

[54] MEANS FOR CONSECUTIVELY GATHERING SEPARATED ROLLS OF SOD AND CONTINUOUSLY ELEVATING THE SAME TO THE LEVEL OF AN ACCOMPANYING VEHICLE

[72] Inventor: Glen R. Hadfield, 4643 Sherwood, Oxford, Mich. 48051

[22] Filed: May 15, 1970

[21] Appl. No.: 37,821

Related U.S. Application Data

[63] Continuation-in-part of Ser. No. 828,897, May 29, 1969, abandoned.

[52] U.S. Cl. ....................198/9, 214/6 B, 214/42 R
[51] Int. Cl. ............................................B65g 67/22
[58] Field of Search.........214/42 R, 6 B; 198/9, 7 BL

[56] References Cited

UNITED STATES PATENTS

| | | |
|---|---|---|
| 3,120,887 | 2/1964 | Holcer......................198/7 BL |
| 3,448,879 | 6/1969 | Lely..........................214/522 |
| 3,521,734 | 7/1970 | Kerber..........................198/9 |
| 3,550,746 | 12/1970 | Juul............................198/7 B |
| 2,597,218 | 5/1952 | Appel............................198/9 |

*Primary Examiner*—Gerald M. Forlenza
*Assistant Examiner*—George F. Abraham
*Attorney*—Berman, Davidson and Berman

[57] ABSTRACT

Means for gathering rolls of sod from the ground. The rolls are in spaced rows and the rolls of each row are separated by substantial distances. The rolls of each row have their axes parallel to the direction of advance of said gathering means. The gathering means comprise at least one leading roll having its axis substantially transverse the direction of advance of the machine as a whole. This roll is continually rotated so that its lowermost surface advances in the direction of advance of the machine as a whole. An inclined conveyor is mounted on the machine and receives rolls of sod which are progressively lifted from the ground by said first-named roll and delivered to said conveyor. Means are provided at the upper end of the conveyor for presenting the rolls gathered to workmen stationed on the accompanying vehicle.

8 Claims, 18 Drawing Figures

INVENTOR.
GLEN R. HADFIELD,
BY
Berman, Davidson & Berman,
ATTORNEYS.

MEANS FOR CONSECUTIVELY GATHERING SEPARATED ROLLS OF SOD AND CONTINUOUSLY ELEVATING THE SAME TO THE LEVEL OF AN ACCOMPANYING VEHICLE

This is a continuation-in-part of my co-pending application, Ser. No. 828,897, filed May 29, 1969, now abandoned.

BACKGROUND OF THE INVENTION

In my previous U.S. Pat. No. 3,387,666, dated June 11, 1968, I disclosed a unitary machine which first frees a strip of sod of predetermined width from the ground and severs the strip transversely into predetermined length. The severing operation is timed so as to cooperate with forward movement of the machine to initiate a rolling up of each severed strip. The rolling up is completed by additional means and further means are disclosed for turning the roll thus formed through 90° so that the axes of the consecutive rolls are in alignment parallel to the direction of advance of the machine.

It is a practice of the industry that each roll should contain one square yard or nine square feet of sod. The length of the sod strip naturally determines the diameter of the roll and on a one square yard basis the width of the severing means therefore determines the diameter of the roll. It is not merely the fact that by trade practice the square yard is a unit of sale that determines the size of the roll. Dependent upon the density of the soil, the thickness of the strip and, quite importantly, the moisture content of the strip, a square yard of sod seldom will weigh less than 50 pounds and frequently as much as 60 or 70 pounds. This is just about the maximum weight which any human operator can be expected to handle throughout a normal 8-hour day. While, chiefly as a result of mergers, a few sod farms today operate on the scale of several thousand acres, the overwhelming bulk of all sod farms lie in the range between 50 and 200 acres. This relatively minor acreage puts a ceiling on the investment in equipment which the average sod farmer can make and still afford to operate. Obviously, if amortization of equipment exceeds the cost of labor saved by the use of the equipment, the farmer is worse off.

The growing, harvesting and marketing of sod, as a product in and of itself is of comparatively recent origin. It originated as cities began to expand in area and the development of suburban homes created a considerable demand for sod. Originally, the sod marketed was simply severed from meadowland which had been grazed for years and the sod was cut and rolled in a most primitive manner in which the strips would be defined by a broad axe; severance was by means of spades and rolling was entirely manual. This occurred in the period when "stoop labor" was both plentiful and cheap. As the buyers became more quality conscious and demanding, machines were developed which first severed strips of sod from the ground in unlimited lengths which lengths were then manually cut into strips and manually rolled.

The next step was to devise an automatically operated transverse cutting means as an adjunct of the sod severing machines. These lateral cutting knives were timed so as to effect a transverse cut every nine feet if the strip severed were 1 foot wide, every 6 feet if the strip cut were 1 ½ feet wide and so on, and this was the state of the art at the time my previous U.S. Pat. No. 3,387,666 was applied for. Under my patent not only is the sod continuously severed in a strip and periodically transversely severed into lengths but each length not only is formed into a roll but the roll itself is turned through 90° whereby to place the rolls of each row in substantially coaxial alignment. The roll is always formed with the grass side inside. These rolls are relatively small, quite dense and possess a surprising degree of elasticity so that, given the slightest encouragement, they will immediately and of their own resiliency unroll. The rolls, therefore, require the most careful handling or unrolling will take place with consequent jamming of any apparatus through which they may be passed or there may be excessive soil loss with resultant excessive exposure of the root system. Theoretically, it would be possible to tie the rolls mechanically just as grain sheaves were tied in the old days and just as hay and straw bales are tied today. This, however, would be a complicating factor when the rolls are formed and would present further complications at the point of use.

| | | |
|---|---|---|
| 1,306,597 | Krogen | 1919 |
| 1,707,725 | Jantz | 1929 |
| 2,400,086 | Hansen | 1946 |
| 2,518,083 | Sims | 1950 |

It will be noted that all of the foregoing patents are designed to deal with sheaves, shocks or bales, and in each case the product being handled is secured by some form of tie which will prevent self-disruption of the item. It is also to be noted that whether the product is a sheave, a shock or a bale, its density is very much less that that of a roll of sod and that in the case of shocks or sheaves of grain, the grain itself which volumetrically is only a small part of the object handled is relatively easy to collect in order to avoid waste. The only particles dislodged from a sod roll is the dirt itself which, of course, simply falls to the ground and which, if any attempt were made in collection, would probably jam the sheave.

It is an object of this invention to provide a machine which will move continuously along a row of sod rolls, lying on the ground, lift each roll off the ground and place it into the nip of opposed conveyors which conveyors will elevate the consecutive rolls to or above a floor level of an accompanying vehicle.

It is a further object of this invention to provide a machine as aforesaid which can be attached to an accompanying vehicle and receive its power and guidance therefrom.

It is a further object of this invention to provide a machine as aforesaid which is both self-propelled and steerable.

It is a further object of this invention to provide a machine as aforesaid having a supplementary conveyor adjacent the upper end of the inclined conveyor whereby rolls of sod delivered to said supplementary conveyor may be removed from said conveyor at various points along the length of the body of the accompanying vehicle.

It is a further object of this invention to provide a machine as aforesaid in which said supplementary conveyor has mounted thereon, and adjustable lengthwise thereof, a transverse conveyor including means to transfer rolls from said supplementary conveyor to said transverse conveyor, said transverse conveyor being arranged so as, at the will of the operator, to deliver said rolls to either side of the supplementary conveyor and to deliver them well within the area of the floor of the body of the accompanying vehicle.

It is a further object of this invention to provide a modification of the machine aforesaid to pick up severed, unrolled lengths of sod and to deliver them in flat condition to an accompanying vehicle.

The above and other objects will be made clear from the following detailed description taken in connection with the annexed drawings, in which:

Figures 1, 10:
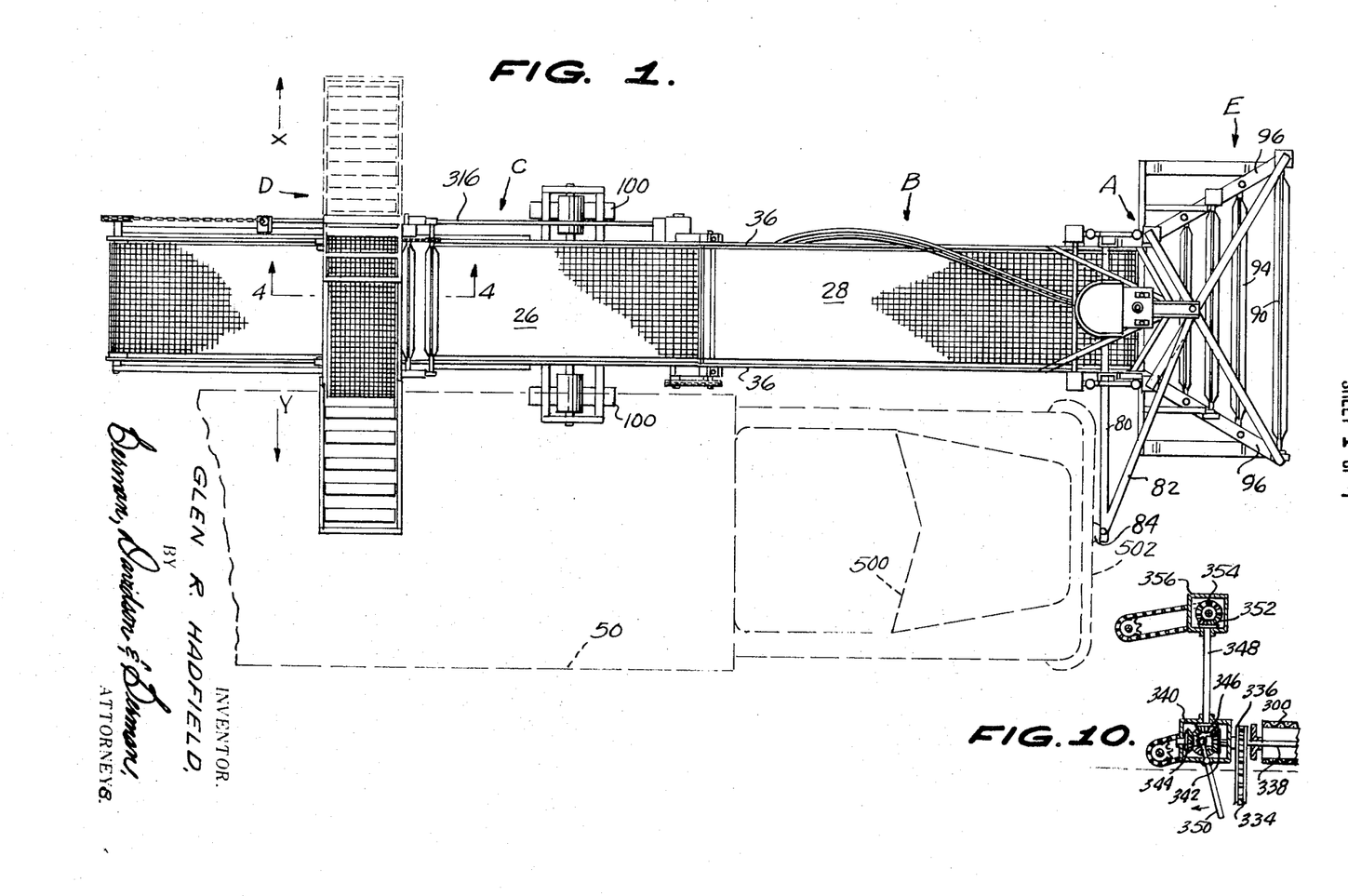
FIG. 1 is a top plan view of a preferred form of the machine.
FIG. 10 is a section taken on the line 10—10 of FIG. 5.
Figures 2, 3, 9:
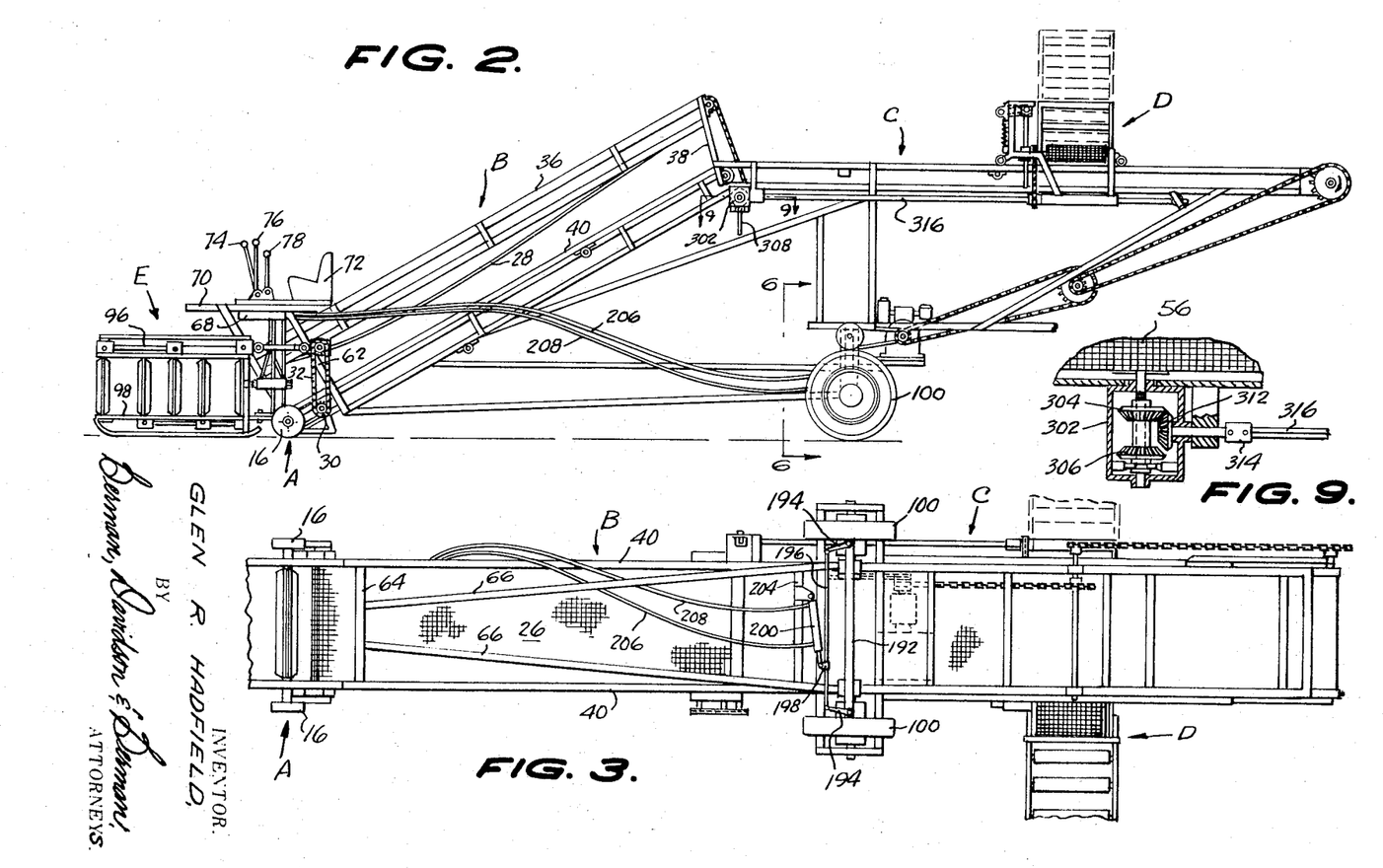
FIG. 2 is a side elevation of the machine illustrated in FIG. 1.
FIG. 3 is a bottom plan view of the rear portion of the machine shown in FIGS. 1 and 2.
FIG. 9 is a section taken on the line 9—9 of FIG. 4.
Figures 13, 14, 15:
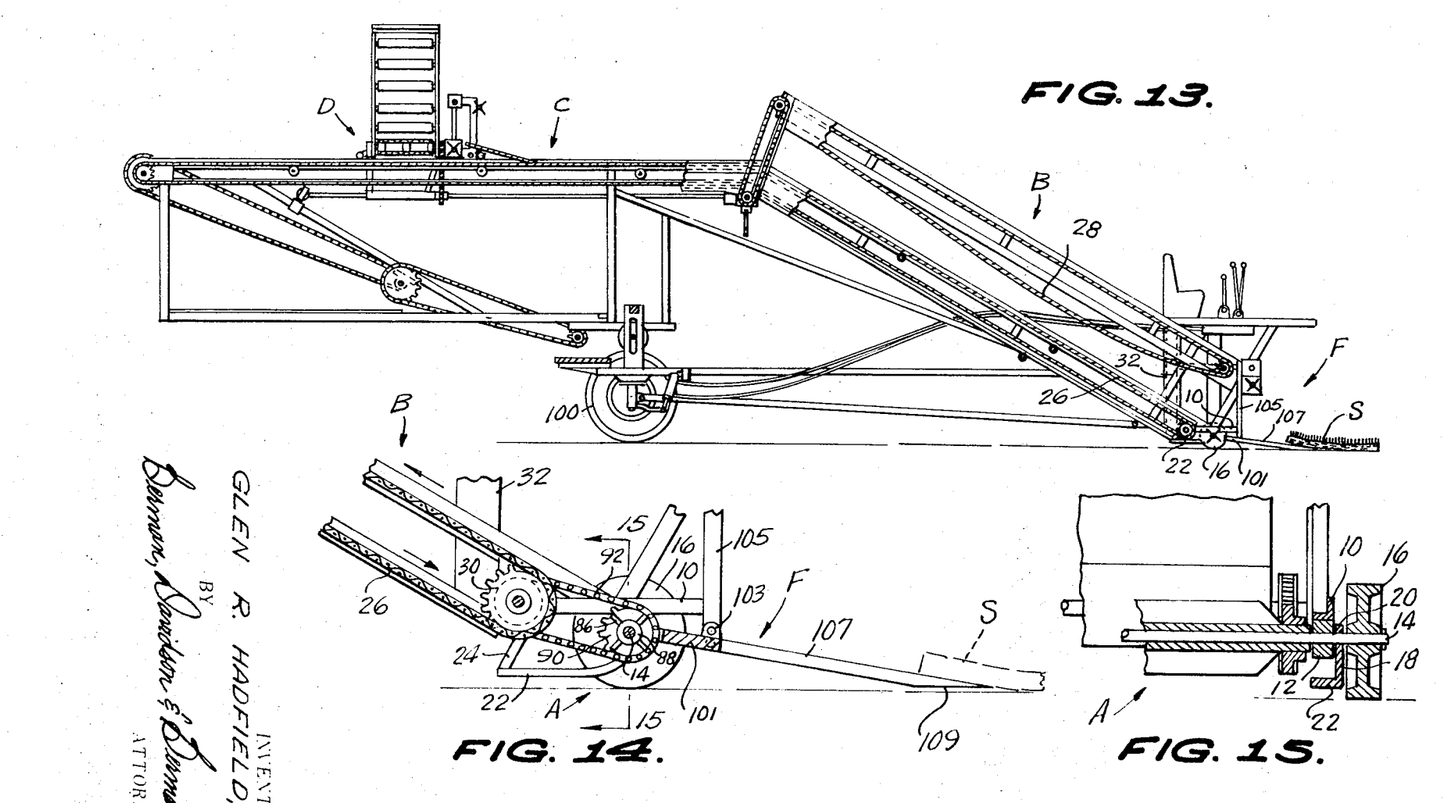
FIG. 13 is a section on the line 13—13 of FIG. 12.
FIG. 14 is a side elevation partially in section of the extreme right end of FIG. 12.
FIG. 15 is a section on the line 15—15 of FIG. 14.

Referring now particularly to FIGS. 1, 2 and 3, the machine is made up of an initial gathering unit A, an upwardly inclined conveyor unit B, a supplementary horizontal conveyor unit C, and optionally, a double acting lateral conveyor unit D. There is optionally provided an advance gathering unit E for a purpose presently to be described. The details of unit A are best shown in FIGS. 13, 14 and 15, where they are shown in conjunction with a modification of the machine adapted as aforesaid to the handling of sheets rather than rolls of sod. Whether sheets or rolls, however, the initial gathering operation is the same.

It is to be understood that except where specifically noted, the mechanical details of the various drives, mountings and adjustments are entirely optional. It is important that certain speed ratios be maintained between the several units and where such ratios are important, interconnections between units should be positive as by gear trains and sprockets rather than by belts wherein slippage could destroy one or more of the several ratios. The precise gear trains and the precise sprocket trains are unimportant and anyone reasonably skilled in the mechanical arts could devise alternative and fully equivalent structures. For this reason, in this disclosure, only minimal details are illustrated and/or described.

The scale of FIGS. 1, 2 and 3 do not permit an adequate illustration of unit A which is best shown in FIGS. 14 and 15. The unit A is made up of a pair of fore and aft horizontal side members 10 which have mounted on their undersides at each side of the machine a bearing 12. The bearings 12 support a shaft 14 which runs the full width of the machine and at each side of the machine is mounted a supporting wheel 16 which rotates freely on the shaft 14. These wheels also appear in FIG. 3 as well as FIG. 2, but are not particularly perceptible in FIG. 1.

Also mounted on the shaft 14 is a member 18 which has an arm 20 surrounding the shaft 14 and a broad portion 22 extending parallel to the ground and slightly spaced above the lowermost periphery of the wheel 16. The skid member 22 at its rear end is joined by a strut 24 to the horizontal member 10.

On normally firm ground, the front end of the machine receives rolling support from the wheel 16. Occasionally, however, it is necessary to navigate relatively soft ground in which the wheels 16 might bog down. The members 22 each adjacent a wheel 16 are designed to prevent the wheel 16 sinking too deeply into the ground when the ground is soft.

Also, in FIGS. 14 and 15, there is shown a lower conveyor belt 26 forming part of the unit B and there is shown particularly in FIGS. 2 and 13 a similar conveyor 28 which is mounted above and spaced from the conveyor 26. The conveyor 26 rides over a sprocket 30 which rotates in a bearing, not shown, but which is attached to a vertical frame member 32 forming a part of the general framing of the unit B.

When the machine is gathering sod rolls from one or more adjacent rolls and whether the machine is operating self-propelled or attached to an accompanying vehicle, steering requirement is at a minimum and is accomplished by limited movement of the section A accompanied by similar movement of section E if the same is attached to section A. In either case, that is, with or without unit E, the steering effort is the same. This particular front end steering will be described hereinafter with particular reference to FIGS. 16, 17 and 18.

When, at the end of a row, it is desired to turn the machine as a whole, perhaps through 180°, it is necessary, as will appear hereinafter, to steer by means of the rear wheels 100 and the particular means of such steering will be discussed hereinafter with particular reference to FIGS. 3 and 6.

Referring back to FIGS. 1, 2 and 3, the unit B, as previously noted, is composed of an upper conveyor 28 and a lower conveyor 26, opposed faces of which move at the same lineal speed. In order to minimize the overall size of the machine, the slope of conveyors 26 and 28 should be as steep as possible. In the parent application, Ser. No. 828,897, filed may 29, 1969, only the lower conveyor 26 is used and this conveyor in that application is equipped with lateral cleats to prevent backsliding of the rolls. In a machine of this type, however, which is to encounter rolls of varying diameter and even flat sheets of sod, it is difficult in the extreme so to synchronize cleats of section B with the delivery of rolls thereto by section A as to avoid having an occasional roll falling across a cleat, with consequent damage to the roll. It has been found that plain conveyors of the mesh belt type holding the rolls between them can advance the rolls up an extremely steep incline without the necessity of providing cleats. It is also highly desirable that the surface speed of the belts 26 and 28 exceed the lineal forward speed of the machine as a whole. When this is achieved, consecutive rolls encountering conveyors 26 and 28 are automatically spaced apart which makes for easier handling when the rolls ultimately arrive at the accompanying vehicle. In addition, such a speed relationship minimizes the number of rolls which are on the inclined conveyors 26 and 28 at any one time and, therefore, tends to reduce the weight bearing on the wheels 16 of the forward end. The weight on the forward wheels which cannot conveniently be very large is further countered by means presently to be discussed.

Considering again FIGS. 1, 2 and 3, the unit B, of course, may be wide enough to carry simultaneously two, three or four rolls of sod but, and equally of course, as the width of the unit B increases so does its cost, weight and power requirements. Moreover, in the absence of unit D, men working on the body 50 of the accompanying vehicle, generally designated 500 and shown in dotted outlines in FIG. 1, may be given an almost impossible lift when they try to take from the supplementary conveyor C rolls delivered adjacent its edge remote from the body 50.

The unit E, best seen in FIGS. 1 and 2, is designed to gather in sod rolls from two or more rows, deliver the rolls to the relatively narrow conveyor B, thence to a supplementary conveyor C of a width equal to that of the conveyors of unit B.

As best seen in FIGS. 1, 2, 3 and 7, the upper conveyor 28 of unit B is supported between upper side frame members 36 which are supported at their upper ends by vertical members 38. The vertical members 38 are secured to lower side members 40 (FIG. 3) which support the lower conveyor 26. As shown in both FIGS. 7 and 13 at the upper end of its inclined portions, the conveyor 26 passes over an idler sprocket 42 and continues to form a horizontal part of the supplementary conveyor C which part is supported by conventional table rolls 44. At the free end of section C, conveyor 26 passes over a sprocket 46 secured to a shaft 48 on which is mounted a drive sprocket 50 receiving power from a chain 52.

Figures 7, 8:
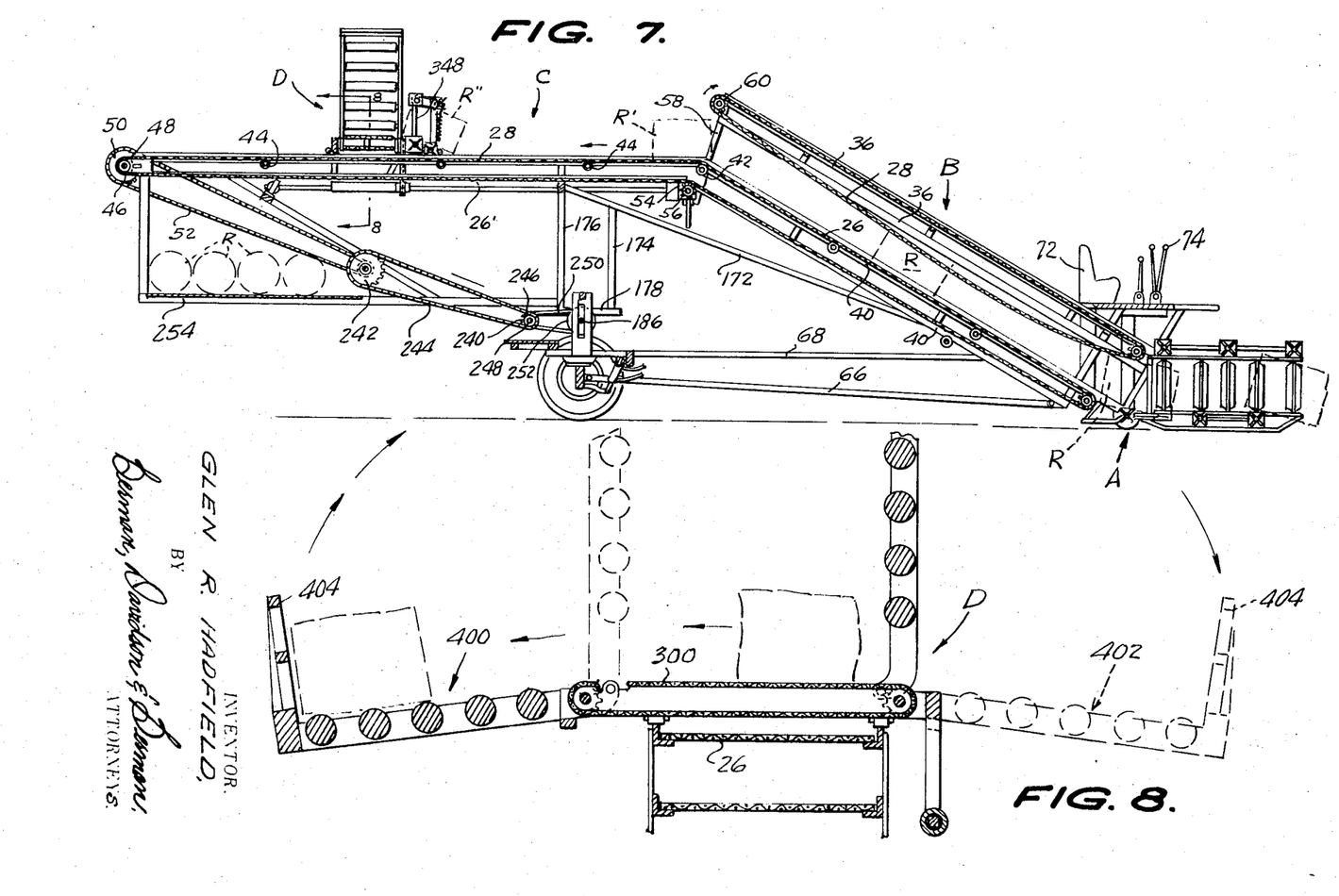
FIG. 7 is a vertical cross section taken on the line 7—7 of FIG. 1.
FIG. 8 is a section taken on the line 8—8 of FIG. 7.

From the sprocket 46, the lower or return pass 26' of the conveyor 26 passes over a sprocket 54 as it enters the inclined section B. The sprocket 54 is keyed to a shaft 56 on which are mounted sprockets, not shown, but which drive a chain 58 which in turn drives a sprocket, not shown, on a shaft 60 which serves to drive the upper conveyor 28, in the appropriate direction relative to the opposing conveyor 26. The drive of the chain 8 will be discussed hereinafter.

At the forward end, the side members 36 and 40 of conveyors 28 and 26 are joined by upright members 62.

As best seen in FIG. 3, the upright members 62 at their lower ends are connected by a horizontal member 64. Diverging stabilizer members 66 extend rearwardly from the cross member 64 back to the driving station presently to be described.

The upper ends of member 62 have a portion extended parallel to the ground and designated 68. Parallel ends 68 with the members 62 preferably are welded to an operator's platform 70 on which is mounted an operator's seat 72 as well as various control levers of which 74, by means presently to be described, is used to steer the rear wheels 100 and levers 76 and 78 control the front wheel. Other controls may be provided such, for example, as an engine starter and controls for various clutches for the several drives. Both the engine mounting and the several clutches remain to be described.

Before proceeding with a detailed discussion of unit E, let it be noted that FIG. 1 includes truss members 80 and 82 converging on a bracket 84 which is attached to the front bumper 502 of the truck 500, best seen in FIG. 1. These will best be joined respectively to the upper portion 68 of member 62 and to an extension of the member 70 as it appears in FIG. 2. A similar lateral bracket acts as a stabilizer for the rear end of unit C. These are used when the vehicle is not self-propelled but is attached to an accompanying vehicle. They are unnecessary when, as will be described hereinafter, the machine is operated as a self-propelled vehicle.

Returning now to unit E, it will be remembered that, as shown in FIGS. 14 and 15, sod rolls (or sheets) are lifted by paddles 86 mounted on a sleeve 88 which is rotatable on the shaft 14, the direction of rotation being counterclockwise as viewed in FIG. 14, the same as sprocket 30. The sleeve 88 is driven by a sprocket 90 secured thereto which in turn is driven by a chain 92 driven by a sprocket on the same shaft as sprocket 30 in FIG. 14. Let it be remembered that FIGS. 14 and 15 illustrate an arrangement which will pick up and load sod rolls. A portion of FIG. 14, directed to initial pick-up of a sheet as distinct from a roll will be discussed hereinafter.

Figures 11, 12:
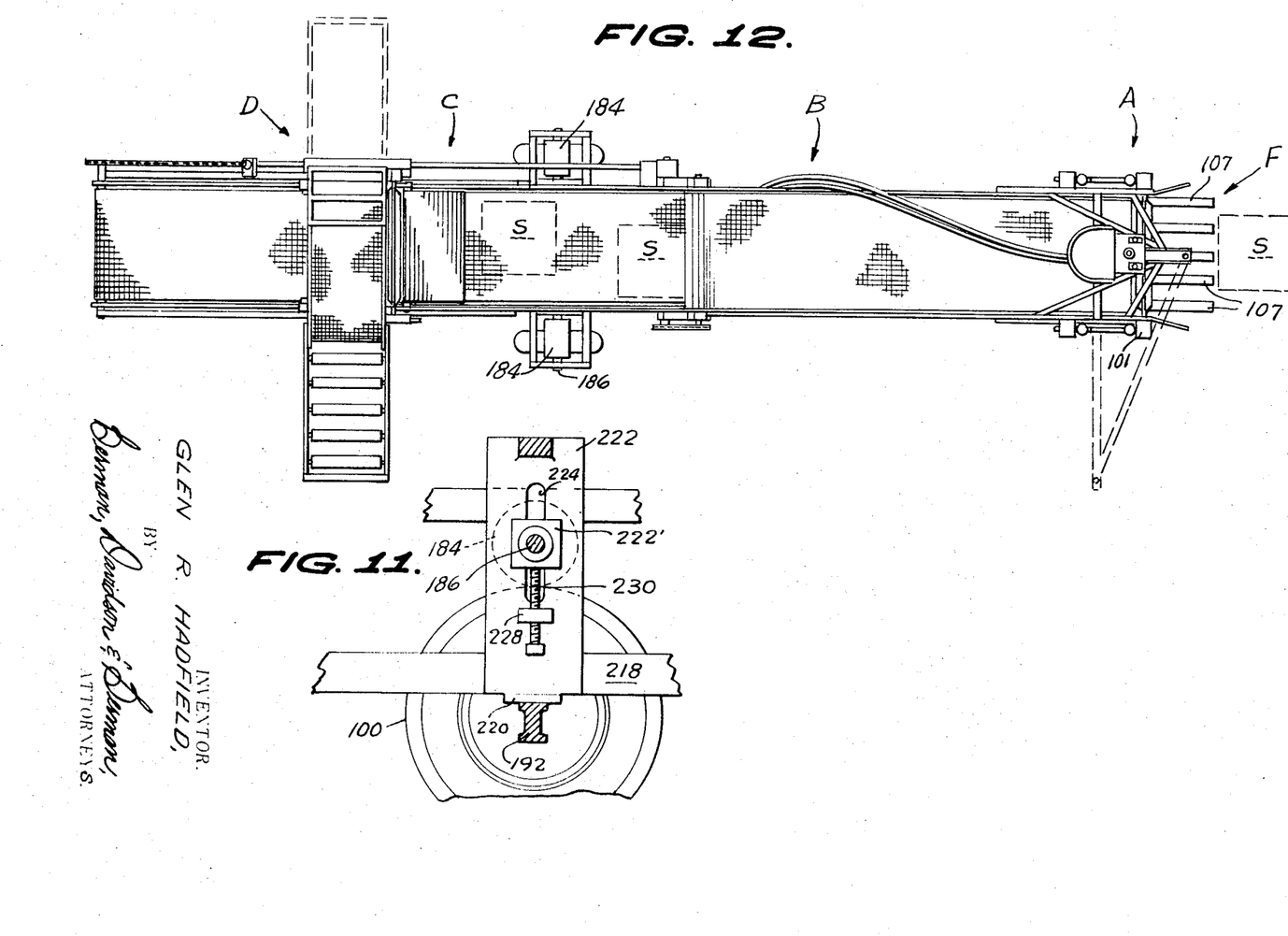
FIG. 11 is a section on the line 11—11 of FIG. 6.
FIG. 12 is a top plan view of a machine similar to that shown in FIG. 1, but modified to handle sod in sheets rather than rolls.

The sheet handling or pick-up unit is designated F in FIGS. 12, 13 and 14. As best seen in FIG. 14, the unit F comprises a cross member 101 pivoted at 103 to a vertical member 105 secured to the horizontal members 10. Tines 107 protrude forwardly from the backing member 101 and at their forward ends have bevels 109 which are generally parallel to the ground. Pivotal movement about the pivot 103 is limited to prevent the tines 107 from digging into the ground. As a result, the tines merely engage a sod strip S and guide (by virtue of forward movement of the machine as a whole) the sheet S to the paddle wheel 86, the motion of which, in combination with the forward movement of the machine as a whole presents the sod sheet to the lower conveyor 26. The upper conveyor 28, as shown in FIG. 13, is forward of the lower conveyor 26. The spacing between conveyors 26 and 28 is exaggerated in FIG. 13. The strip S, usually 3' by 3' will have a thickness of only about 2 inches. As seen in FIG. 13, the upper conveyor 28 is permitted to have a perceptible sag so as to ensure full engagement between the strip S and the conveyor 28.

As best seen in FIGS. 1 and 2, the unit E is made up of upper horizontal paddle wheels designated 88, 90, 92 and 94. These wheels increase in width forwardly of unit A and their ends are journaled in projecting diverging side members 96 which overlie similar divergent side members 98 adjacent ground level. As seen in FIG. 2, however, sod members 98 are supported by skids 102 which rest on the ground. Similar horizontal paddle wheels are journaled between members 98. The unit E will now be described with particular reference to FIGS. 1 and 2. In FIG. 1, it will be seen that the unit is provided with upper paddle wheels 88 and 90 and with lower or ground level paddle wheels 92 and 94. Both upper and lower wheels increase in length outwardly from unit A. The upper wheels are journaled in diverging upper horizontal members 96 while the lower rollers or paddle wheels are journaled in parallel diverging members 98.

It is further to be noted, especially in FIG. 2, that vertical paddle wheels stand on each side between divergent side members 96 and 98. These are driven wheels and operate to gather in, narrow the pattern to rolls and for sod encountered by the unit E.

Figure 16:
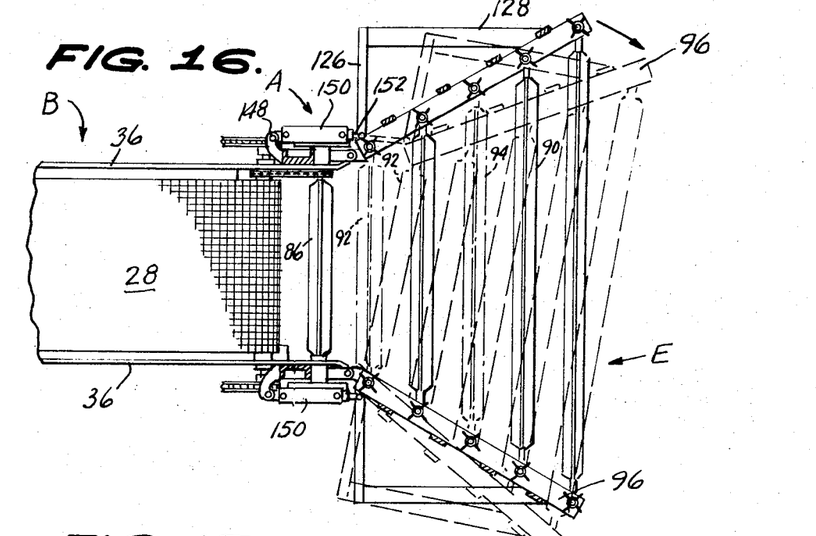
FIG. 16 is an enlarged top plan view of unit E.
Figure 17:
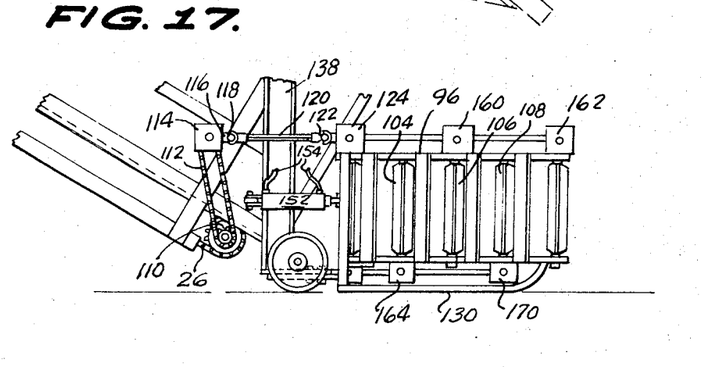
FIG. 17 is a side elevation of FIG. 16.
Figure 18:
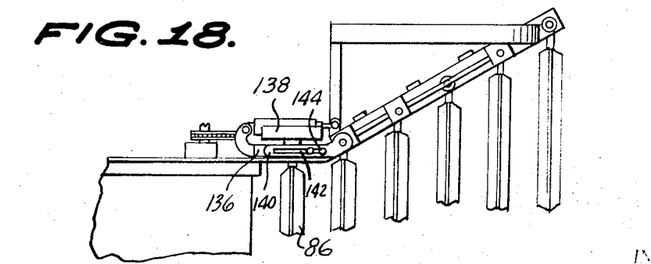
FIG. 18 is a bottom plan view of FIG. 16.

The scale of FIGS. 1 and 2 precludes any detailed examination of the structure. Reference will now be had to FIGS. 16, 17 and 18, where the parts thus far discussed with reference to FIGS. 1 and 2 will be easily recognizable.

Mounted on vertical axes between the upper and lower members 96 and 98 are a plurality of vertical paddle wheels 104, 106 and 108. There is a forwardly diverging row of vertical paddle wheels on each side of the unit E. These serve to gather in rolls of sod from two or more rows and are centered on the inclined conveyor system B. When the unit E is used, obviously, conveyor systems B, C and D must be operated at a lineal speed considerably exceeding forward lineal speed of the machine as a whole.

At risk of reiteration, it seems well at this point to reemphasize that the details of mechanical drive in the several units are not critical. Those illustrated and described herein are effective, but then, other drives, equally effective, could be devised by any competent engineer. Referring back to FIG. 14, it will be seen that the lower conveyor 26 passes around a sprocket 30 secured to a shaft 31 and these same parts are visible in FIG. 17. An auxiliary sprocket 110 is also secured to the shaft 31 and drives a chain 112 which engages a sprocket, not shown, mounted on a gear box 114 which contains bevel gears driving a shaft 116. The shaft 116 joins a universal joint 118 on a shaft 120 which, at its opposite end, has a universal joint 122 which enters a gear box 124. A slip joint, not shown, is provided in shaft 120 so that the shaft is extensible for a purpose presently to be described.

The unit E is strengthened and rigidified by cross members 126, the upper of which joins diagonal members 96 and the lower of which joins the diagonal members 98. Strips 128 join the free ends of cross members 126, respectively, to diagonal members 96 and 98. Skids 130 are secured to the lower members 98 and afford ground support for the unit E. As seen in FIG. 1, diagonal strips 132 and 134 further strengthen unit E.

As best seen in FIG. 18, a bracket 136 is secured to an upright 138 which is secured between side members 36 and 40 of section B. A slide 140 has a slot 142 surrounding a pin 144 mounted on the bracket 136. The forward end of the slide 142 forms a pivot 143 about which unit E may rotate for a purpose presently to be described. The opposite end of bracket 136 is curved and pivoted at 148 to a cylinder 150 which has a piston rod 152 pivoted to a cross member 126. The piston is supplied with operating fluid through flexible tubes 154 (FIG. 17) and, as appears in FIG. 16, a similar arrangement occurs at each side of unit E.

The arrangement just described is to permit unit E, shown in full lines in FIG. 16, to be shifted to the dotted line position shown in that figure or to an alternative position of angularity opposite to that of the dotted line position shown in FIG. 16. This, as previously noted, permits limited steerability when the machine as a whole is proceeding along a row and gathering rolls of sod.

While front end steerability has just been discussed in connection with unit E, the principle is easily and equally applicable to unit A in the absence of unit E, and usually this will be the case.

Gear boxes such as 114 and 124 are quite conventional and in this case contain bevel gears so that by interconnecting gear box 124 with other gear boxes 160, 162, 164 and 170 may be distributed between both sets of horizontal paddle wheels and both sets of vertical paddle wheels.

In part, the operation of unit C has been touched upon hereinbefore. However, before going into a detailed discussion the units C and D and their coaction, it seems worthwhile to explain something of what the problem is in loading a truck with sod.

A typical truck body for sod hauling will present for loading a flat bed roughly 8 feet wide by 17 feet long and the truck will be able to tilt the body in the manner of a dump truck. If properly loaded and handled, a truck load of sod can be dumped, virtually undisturbed, on a level piece of ground. The operation requiring only the driver and a helper who acts as an observer and signalman for the driver as the truck body is first tilted, and then the truck advanced so that the rate of advance of the truck approximates the rate of slide of the sod down the inclined flat body, thus depositing an undisturbed truck load ready for the landscaper to take over and apply the sod to the designated premises. It will be noted in FIG. 1 that units A and B terminate at the upper end of B approximately at the forward end of the body with units A and B overlapping the cab and engine portion. On the road, of course, the truck body may be provided with side boards and a tail gate at the option of the operator. The unit C is designed and proportioned to permit loading of sod beginning at either end of the truck body. The area of the truck body is limited, even initially, and becomes more limited as sod accumulates on the truck so that three or at most four men may be employed in distributing sod within the truck body and this is an obvious limit to the man power employable at any particular time. With the use of the present machine, it is perfectly possible to bring rolls of sod up to loading position at a rate faster than the amount of man power which the truck will accommodate possibly can handle. Accordingly, the driver of the truck who after all controls the rate of forward movement and, therefore, the rate of sod loading, has the primary responsibility for not overloading the men.

Referring now particularly to FIG. 7, the sod rolls R are shown being elevated by unit B onto unit C and, as previously described, the conveyor 26 is common to both units B and C. FIG. 7 also shows a roll R' in the process of being transferred from the conveyor of unit B to the conveyor of unit C.

Referring to FIG. 3, the divergent rearwardly extending truss members 66 already have been mentioned as running from cross member 64 rearwardly toward the end of unit B. In addition, as shown particularly in FIG. 2, there are tie-rods 68 running rearwardly from the side members 40 and both such members appear in FIG. 7. In addition, at each side there are tie members 172 running from side members 40 upwardly and rearwardly and secured to vertical members 174 and 176 which are attached to the side members of unit C and downwardly to join a cross member 178.

At each side (FIG. 6) cross member 178 joins outer vertical members 180 and inner vertical members 182. A roller 184 is journaled at each side of the machine in vertical members 180 and 182, and each of the roller members 184 rests on a wheel 100. The rollers 184 are joined to a transverse shaft 186, as will appear in FIG. 6, the viewpoint of which is indicated in FIG. 2.

Figure 6:
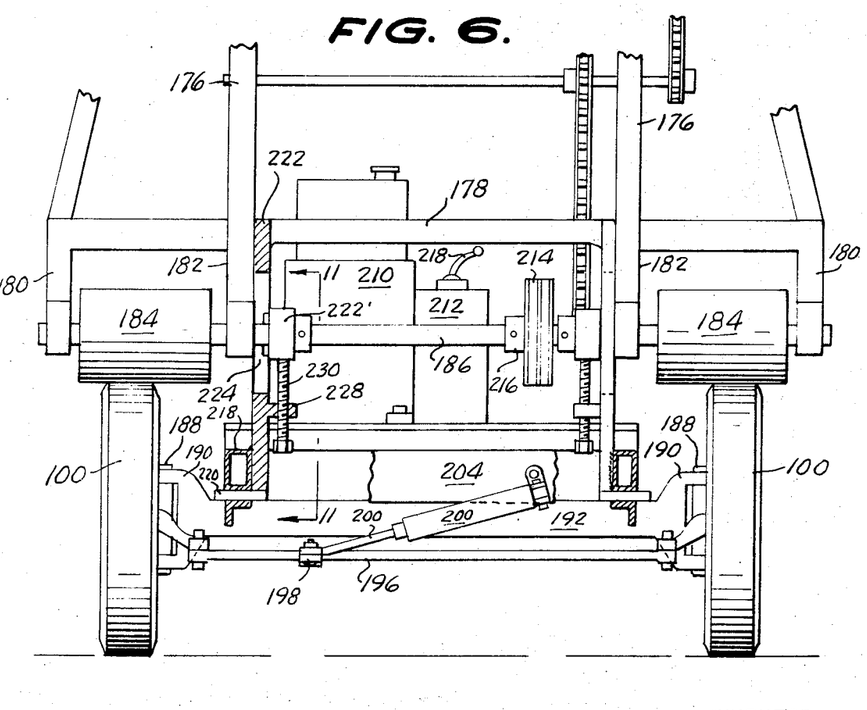
FIG. 6 is an elevation partly in section taken on the line 6—6 of FIG. 2.

Also, as seen in FIG. 6, the wheels 100 are journaled on axles, not shown, attached to king pins 188 which are journaled in the forked ends 190 of a transverse frame member 192. Each of the king pins 188 is secured to an arm 194, the extremities of which are pivoted to a connecting rod 196.

As best seen in FIGS. 3 and 6, the connecting rod 196 has secured thereto a bracket 198 which is pivoted to the piston rod 200 of a cylinder 202 which in turn is pivoted to a fixed cross member 204. The cylinder 202 is powered by hydraulic fluid supplied through lines 206 and 208 which are connected to a pump-sump system, not shown, and are controlled by a four-way valve, not shown, operated by the lever 74 adjacent the driver's seat, as best seen in FIG. 2.

It will be recognized from FIGS. 2 and 6 that the axes of rollers 184 and wheels 100 are parallel with the axes of rollers 184 vertically above the axes of wheels 100. A vertical relationship is maintained by the tie-rods 67 and 68 and 172.

A motor 210 (FIG. 6) through a gear box 212 drives a pulley, not shown, which through a belt 214 drives a pulley 216 teamed to the cross shaft 186 which carries the rollers 184. By means presently to be described, most or all of the weight of units A, B, C and D thrust downward on rollers 184, pressing them against the tires of the wheels 100. When, therefore, the shaft 186 is rotated by the motor 210, the result is a propelling force on the wheels 100 through their contact with the rollers 184. Since the axis of rollers 184 and wheels 100 are parallel in a common vertical plane, if the piston rod 200 of the cylinder 202 moves in or out of the cylinder, the result will be a movement to left or right in FIG. 6 of the connecting rod 196 and a consequent turning of the wheels 100 around their king pins 188 so that a highly effective steering action is produced at the end of a row of rolls of sod.

The gear box 212 is conventionally controlled by a handle 218 to set the general ratio of the speed of the motor 210 to that of the shaft 186. The ratio will be determined by the rpm at which it is desired to drive the motor 210 and by the forward speed demands of the machine as a whole, which is determined by the rpm of the shaft 186.

Because substantially the weight of the entire machine presses down on rollers 184, it may be that, dependent upon the softness of the ground, the steering effort required may become excessive, even with the assistance of the hydraulic cylinder 202. To overcome this, means are provided to divide the machine weight between the rollers 184 and the wheels 100 so that the turning effort, occasioned by frictional contact between the rolls 100 and the ground as well as by frictional contact between the rolls 100 and the rolls 184 may be set at such a level that only acceptable steering effort will be required to turn the wheels 100. This arrangement will be described immediately hereinafter.

It will be observed in FIG. 6 that attached to cross member 192 and adjacent the cross member 204 is a rectangular box beam 218 which extends horizontally and which rests on a forwardly extending member 220. A vertical member 222 is attached both to the box member 218 and horizontal member 220. The vertical member 222 has a vertical slot 224 which slidably but non-rotatably receives a pillow block 222' through which the axle 186 passes. The location of these parts is defined between FIG. 6 and FIG. 11 of this disclosure. Attached to member 222 is an inwardly horizontally projecting member 228. Threaded through the member 228 is a bolt 230 bearing against shims, not shown, between the upper end of the bolt 230 and the block 222'. In order to adjust the pressure between the roll 184 and the wheel 100, it is only necessary to jack up the arm 180 in which the shaft 186, bearing the roll 184 is mounted, and then to add or remove one or more shims between the block 222' and the bolt 230. Upon removal of the jack, only a limited portion of the weight of units A, B, C and D will be transferred to the roller 184 and, therefore, the turning effort necessary to steer the wheels 100 will be adjusted to the capacity of the cylinder 202.

Referring again to FIG. 7, previously referred to, chain 52 passes around a sprocket (not shown) secured to a shaft 240 to which is also secured a sprocket 242 driven by a chain 244 which passes around a sprocket 246 secured to a shaft 248 on which is secured a pulley (not shown) driven by a belt 250 from a pulley 252 on the shaft 186. The shafts 240 and 248 are mounted in frame members (not shown) which form part of the unit C.

Quite obviously, there is a limit to the weight to be borne by the front wheels 16 and/or the skids 130 (FIGS. 2 and 17) if front end steerability is to be maintained. As a matter of fact, the wheel 16 very well may be equipped with central peripheral ridges similar to those found on the front tires of conventional four-wheel tractor wheels in order to facilitate such steering. In order, however, to minimize weight on the wheel 16 and accompanying parts to a minimum insuring steerability without undue penetration to ground a platform 254 may be secured to the longitudinal or side members of unit C and upon the platform 254 may be placed either rolls or sheets of sod to constitute a counterweight balancing the machine as a whole about the axis of the wheels 100 so as to minimize the weight bearing on wheels 16. A consideration of unit D is now quite in order. This unit has very considerable utility but at the same time very definitely is optional. This entire invention is devoted to the proposition of minimizing human effort exerted throughout an 8-hour day, such minimization being consistent with maximum productivity which, in this particular case, may be equaled to the number of rolls of sod successfully loaded on truck bodies up to and including the maximum capacity of such truck bodies.

Unit D (FIGS. 4, 5, 8, 9 and 10) consists primarily of a chain belt conveyor 300 which runs transverse the upper run of the conveyor 26 in unit C. As will presently appear, the conveyor 300 is reversible at the will of the operator so that, as viewed in FIG. 1, it may deliver in the direction of the arrow X or conversely in the direction of the arrow Y, both as seen in FIG. 1. The conveyor 300 is mounted above conveyor 26 of unit C and rolls of sod advancing with their axes parallel to the direction of advance of the conveyor 26 are transferred to the conveyor 300.

Referring now to FIG. 8, the conveyor 300 is shown as mounted transverse the conveyor 26 of unit C and a roll of sod R'' (see FIG. 7) is shown in approximately the position in which it is transferred to conveyor 300 while being removed from conveyor 26 of unit C.

Referring now to FIGS. 2 and 9, it will be noted that a gear box 302 is provided at the intersection of units B and C. As shown in FIG. 7, the shaft 56 is driven by a sprocket 54 over which the lower pass 26' of the conveyor 26 passes, the shaft 56 enters the gear box 302 and is slidably keyed to opposed bevel gears 304 and 306 which, under the control of handle 308 (FIG. 2) may alternatively be brought to mesh with a bevel gear 312. Through a coupling 314, the gear 312 reversibly drives a square shaft 316 which, as seen in FIG. 1, extends a full length of unit C.

Figure 4:
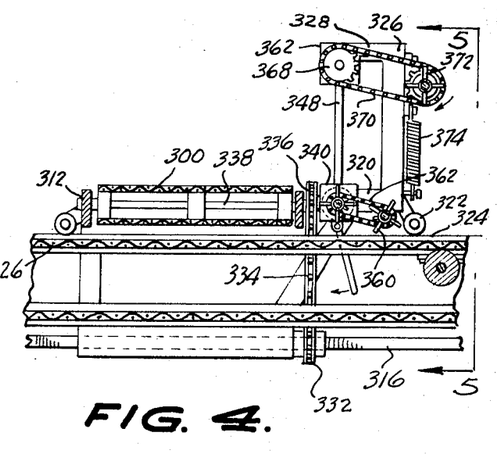
FIG. 4 is a section taken on the line 4—4 of FIG. 1.
Figure 5:
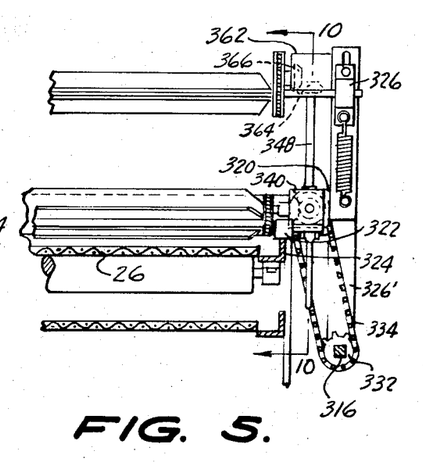
FIG. 5 is a section taken on the line 5—5 of FIG. 4.

Referring now to FIGS. 4 and 5, the conveyor 300 is mounted on a carriage 320 supported by wheels 322 which ride on rails 324 provided at each side of the conveyor 26 of unit C. The carriage 320 is provided with an upright arm 326 and to the upper end of arm 326 is secured a horizontal arm 328. A gear box 330 is secured to the arm 328 and its purpose will be described hereinafter.

A sprocket 332 has a bearing in the downward extension 326' of the member 326 and is slidable on the rotating square shaft 316. Chain 334 is driven by the sprocket 332 and in turn drives the sprocket 336, which forms the actual driving means for the transverse conveyor 300. As shown in FIG. 4, the sprocket 336 is mounted on a shaft 338 which has bearing at one end in the frame 312. The opposite end of the shaft 338 enters a gear box 340.

Reference will now be had particularly to FIGS. 5 and 10.

Inside the gear box 340 there is slidably keyed to the shaft 338 a pair of opposed bevel gears 342 and 344 which selectively mesh with a bevel gear 346 keyed to a shaft 348. Selection is accomplished by means of a handle 350. At its upper end the shaft 348 has keyed to it a bevel gear 352 which meshes with a bevel gear 354, both being in a gear box 356. The gear 354 is connected directly to a paddle wheel 358 mounted directly above the conveyor 26 of unit C, as best seen in FIG. 5. A comparison of FIGS. 9 and 10 will show that while the conveyor 26 runs always in one direction, the conveyor 300 is reversible and the reversing of the conveyor 300 is accomplished by the reverse gearing shown in FIG. 9. A chain 362 connects the paddle wheel 358 to another and lower mounted paddle wheel 360 which is pivoted on an arm, not shown, and operates as a primary lifter for an advancing sod roll on the conveyor 26.

At its upper end vertical shaft 348 enters a gear box 362. A bevel gear 364 at the upper end of shaft 348 meshes with a bevel gear 366 to drive a sprocket 368 (FIG. 4). The sprocket 368 drives a chain 370 which drives an upper paddle wheel 372. The wheel 372 may be slidably or pivotally mounted to be capable of some vertical movement and is biased downward by a spring 374, thus permitting the arrangement to accommodate sod rolls of various diameters. The initial paddle wheel 360 lifts up the advancing end of a roll of sod so that its upper surface engages the paddle wheel 372 and the two combine to advance the roll onto the conveyor 300, whence it may be directed to either side of the unit C.

As will be seen in FIG. 8, a roller conveyor, generally designated 400, is mounted at one end of the conveyor 300, and a similar conveyor 402 is mounted at the opposite end. Optionally, each conveyor may have at its free end a stop plate 404. Each conveyor has a hinge connection to one of the shafts of conveyor 300 and each is provided with a stop to limit its downward inclination. When unit D is in use, the machine is designed to have the working level of unit C fairly well above the floor of the truck body. As previously noted, unit D is movable at will for virtually the full length of the conveyor unit C and with the unit D equipped as just described, delivery can be made at will to either side of the conveyor 300 simply by swinging the appropriate roller conveyor into place. This brings the sod rolls well within the body 50 of the truck 500 and reduces the effort necessary properly to place the rolls of sod when loading the truck.

What is claimed is:

1. A machine for collecting, elevating and delivering sod rolls from the ground comprising a frame, ground-engaging wheels supporting said frame for movement over the ground, an inclined endless conveyor mounted in said frame and extending substantially from the bottom to the top thereof, a second inclined endless conveyor mounted in said frame in vertically spaced parallel relation to said first conveyor, said first and second conveyors adapted to engage the bottom and top surfaces respectively of a roll of sod to convey the roll of sod upwardly in said frame while preventing the roll of sod from unrolling, means on said frame for receiving and delivering the roll of sod from said first and second conveyors, means on said machine for directing rolls of sod on the ground into contact with said first and second conveyors, said roll directing means including a rough surfaced roller as the leading member thereof, said roller having its lower surface in close proximity to the ground and having its axle transverse to the axes of the sod rolls in a row, means for rotating said roller so that its lower surface moves in the direction of advance of the apparatus along a row of sod rolls, said roller being surfaced with a plurality of radially spaced and projecting blades, a plurality of driven rollers in advance of the first named roller, said rollers being of consecutively greater axial length forwardly of the apparatus and having on each side of said rollers a plurality of similar driven vertical rollers of mutually equal axial length to define a converging path toward said first named roller.

2. The machine of claim 1, including means to tilt the several rollers in a horizontal plane to present said converging path at an angle to the direction of advance of said apparatus.

3. A machine for collecting, elevating and delivering sod rolls from the ground comprising a frame, ground-engaging wheels supporting said frame for movement over the ground, an inclined endless conveyor mounted in said frame and extending substantially from the bottom to the top thereof, a second inclined endless conveyor mounted in said frame in vertically spaced parallel relation to said first conveyor, said first and second conveyors adapted to engage the bottom and top surfaces respectively of a roll of sod to convey the roll of sod upwardly in said frame while preventing the roll of sod from unrolling, means on said frame for receiving and delivering the roll of sod from said first and second conveyors, means on said machine for directing rolls of sod on the ground into contact with said first and second conveyors, said first inclined endless conveyor having a horizontal extension on its upper end and means on said receiving and delivering means for transferring rolls of sod from said horizontal extension to said receiving and delivering means.

4. A machine as claimed in claim 3, wherein said directing means includes upper and lower conveying means for contacting the respective upper and lower surfaces of the rolls of sod to prevent the rolls of sod from unrolling during conveyance to said inclined conveyors.

5. A device as claimed in claim 3, wherein said receiving and delivering means includes a transverse endless conveyor.

6. A device as claimed in claim 4, wherein said receiving and delivering means includes a transverse endless conveyor.

7. A device as claimed in claim 5, wherein said transverse endless conveyor is longitudinally adjustable as a unit.

8. A device as claimed in claim 6, wherein said transverse endless conveyor is longitudinally adjustable as a unit.

* * * * *